April 21, 1959  A. SCHEITERLEIN  2,882,884
FUEL INJECTION INTERNAL COMBUSTION ENGINE
Filed Feb. 18, 1957  3 Sheets-Sheet 1
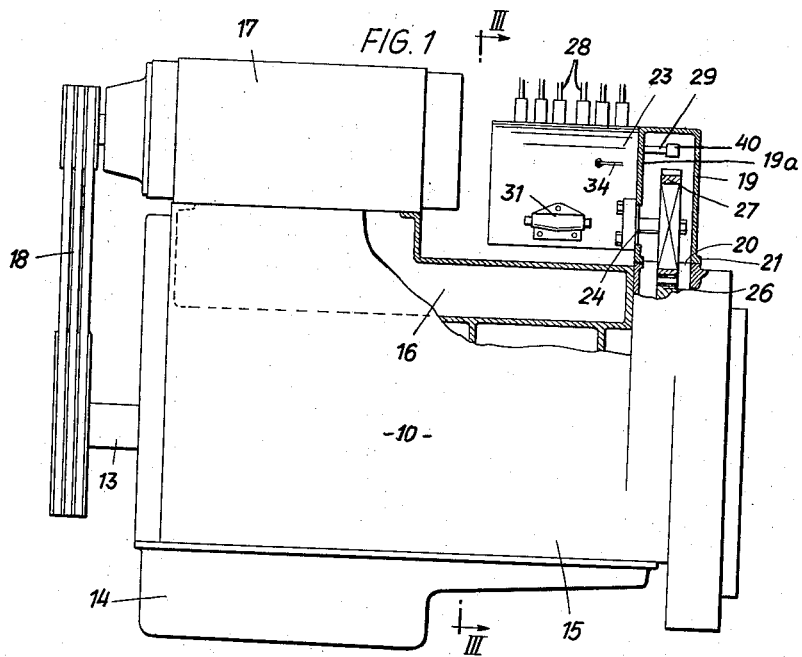
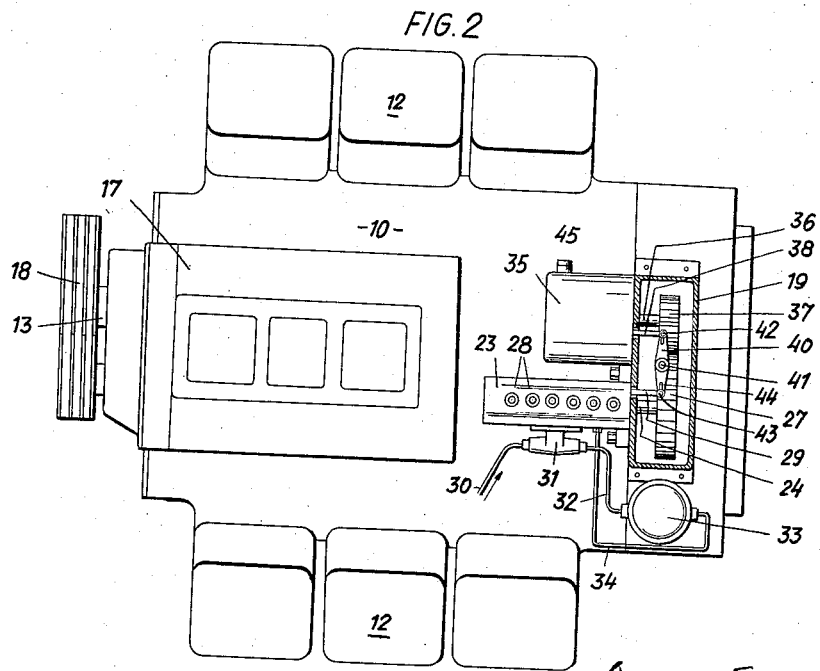
ANDREAS SCHEITERLEIN
INVENTOR
BY
WATSON, COLE, GRINDLE + WATSON
ATTORNEY April 21, 1959     A. SCHEITERLEIN     2,882,884
FUEL INJECTION INTERNAL COMBUSTION ENGINE
Filed Feb. 18, 1957     3 Sheets-Sheet 2
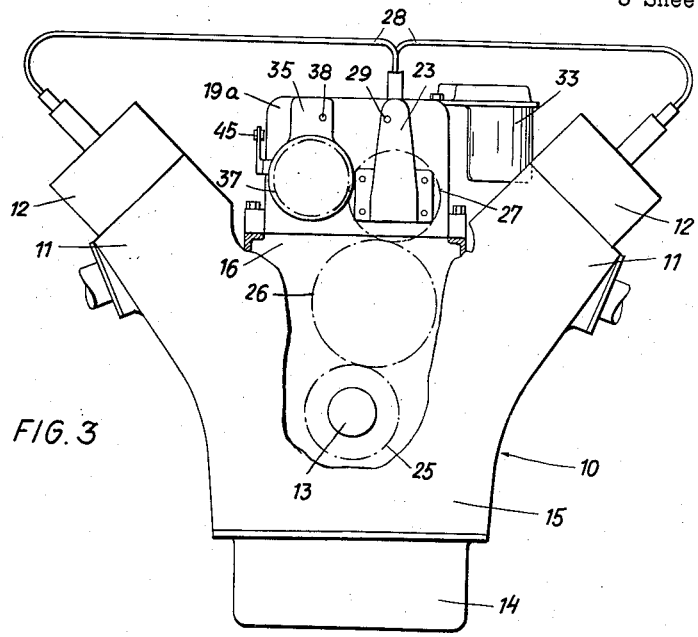
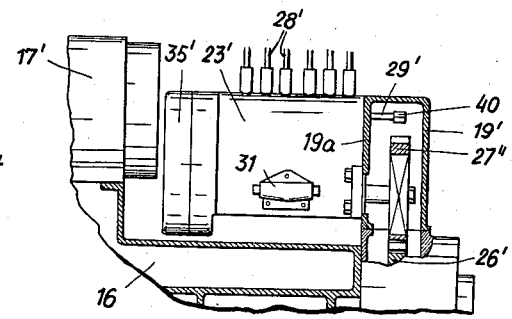
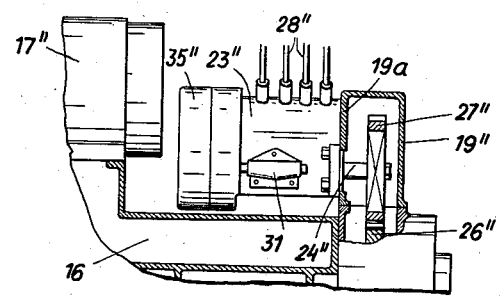
ANDREAS SCHEITERLEIN
INVENTOR
BY
WATSON, COLE, GRINDLE & WATSON
ATTORNEY April 21, 1959     A. SCHEITERLEIN     2,882,884
FUEL INJECTION INTERNAL COMBUSTION ENGINE
Filed Feb. 18, 1957     3 Sheets-Sheet 3
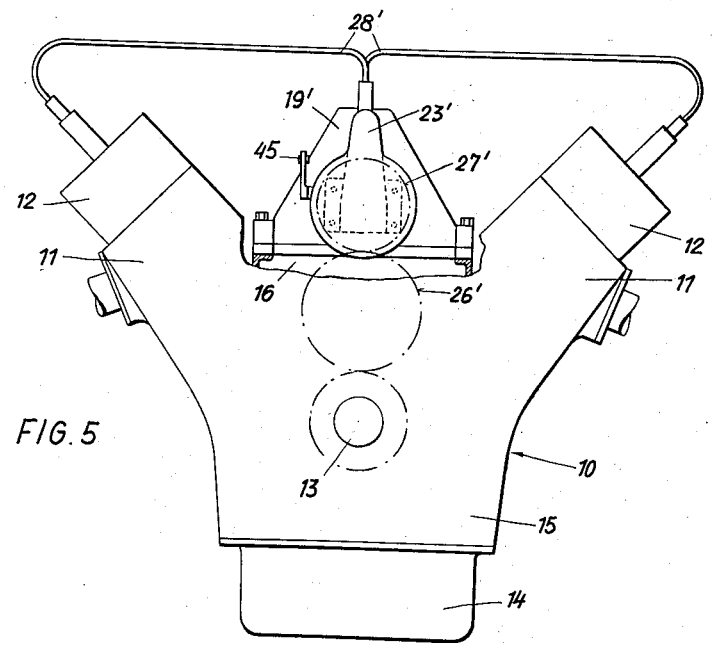
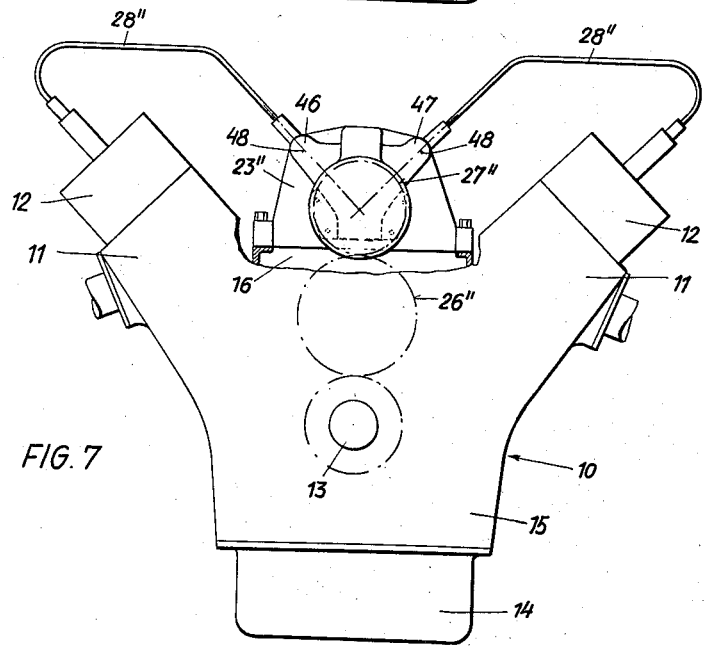
Andreas Scheiterlein
INVENTOR
BY
Watson, Cole, Grindle & Watson
ATTORNEY

# United States Patent Office
2,882,884
Patented Apr. 21, 1959

2,882,884
FUEL INJECTION INTERNAL COMBUSTION ENGINE

Andreas Scheiterlein, Graz, Austria, assignor to Gustav Ospelt, Vaduz, Liechtenstein Application February 18, 1957, Serial No. 640,636

Claims priority, application Austria February 21, 1956

8 Claims. (Cl. 123—140)

This invention relates to improvements in the fuel injection systems of internal combustion engines and has for its objects to achieve compactness, simplicity and ready accessibility for repairs and adjustment of the injection mechanisms and their related parts both as applied to the engines and as units adapted for application thereto.

The invention is particularly applicable for use in connection with multi-cylinder V-type engines of the class in which the engine block or housing includes a scavenging air or plenum chamber arranged between and above the upwardly diverging banks of cylinders and in communication therewith. In such engines it is customary to mount a supercharger or scavenging air compressor on the said air chamber and also between the diverging banks of cylinders for the purpose of achieving compactness of the overall engine structure, as well as achieving certain obvious advantages such as direct communication between the compressor and air chamber. In order to further contribute toward the compactness of the engine it is desirable to also arrange the fuel injection pump and its governor together with various accessories in this same space between the two banks of cylinders and in a manner whereby neither the air compressor nor blower nor the injection pump and governor will project beyond the engine housing in the direction of its crankshaft.

Such compactness, however, has not been successfully attained heretofore due to the fact that the combined lengths of these several elements, particularly when used in conjunction with a relatively small or short engine of the V-type of, for instance, six cylinders or less, will normally be greater than the length of the engine. Moreover, the arrangement of the air plenum chamber in overlying relation to the engine cylinders has in many cases rendered it desirable to extend the driven shafts or portions of the injection pump and/or its governor beyond the end of both the said chamber and the engine itself whereby the said units may be readily driven by means externally of the engine.

The present invention has been conceived with the foregoing considerations in mind and therefore an important feature of the invention consists in combining the fuel injection pump with such an engine in such manner that a gear box which carries the injection pump is secured over the engine housing adjacent one end of the said air chamber, the latter terminating somewhat short of the end of the engine housing. The gear box houses drive means which is connected through the said opening with drive means in the engine housing, and the injection pump per se is supported from the gear box in cantilever manner in which it projects back over the air chamber and yet leaves ample room for mounting of a usual air compressor over the relatively remote end portion of the chamber. By virtue of this arrangement the fuel injection pump may be placed in direct driven relation with the engine crankshaft without interference from the air chamber to provide a completely enclosed drive. And furthermore, the air chamber and the injection pump and also a compressor for the air chamber may be compactly disposed between the rows of the cylinders and within the overall length of the engine.

As a further feature the invention contemplates the combination of the fuel injection pump and its controlling governor on a gear box the several said parts being adapted for mounting as a preassembled operative unit over an opening in the engine housing whereby drive gearing within the gear box may intermesh with gearing within the engine housing. In a preferred embodiment the governor and the mechanism for controlling the volumes of the successively injected fuel charges are operatively interconnected through a linkage enclosed within the gear box.

A novel aspect of the said preferred embodiment consists in providing both the injection pump and its governor with control rods which extend into the gear box for movement parallel to the drive shafts of their respective units but at locations eccentric to these drive shafts to thus avoid interference with the gearing through which these said shafts are driven.

Also such preassembled unit including the injection pump, governor and gear box as above mentioned may further include a fuel supply pump and fuel strainer supported from the gear box and cooperating in usual manner with the injection pump whereby the gear box and its supported mechanism may be preassambled as a complete operative unit prior to application to the engine and may be removed, operated as a complete unit on a test block, and repaired or adjusted as necessary while removed from the engine.

It is also an object to provide such a unitary arrangement of the gear box and its associated mechanism as will facilitate separate replacement of either the injection unit, governor or the associated supply pump and strainer.

The invention further includes a specifically novel arrangement of the fuel injection pump wherein the multiple pump cylinders are arranged in two banks which diverge upwardly in V formation analagous to the arrangement of a V-type engine thereby permitting the attaining of further compactness, the simplification of the connections between these pump cylinders and the respective engine cylinders. This particular arrangement also permits the use of a common rotor or cam shaft for actuating the pistons of both banks of cylinders.

The foregoing features and advantages are attained in whole or in part by each of the several embodiments of the invention illustrated in the accompanying drawings in which:

Figure 1 is a schematic side elevation, partly in section, of a V-type engine incorporating the preferred form of the invention and capable of attaining all of the advantages above enumerated.

Figure 2 is a plan view of the structure shown in Figure 1, a portion of the gear box being broken away to better disclose its interior constructions.

Figure 3 is a front end elevation of the structure shown in Figures 1 and 2, a portion of the engine block or housing being broken away to show diagrammatically the driving connection between the crankshaft of the engine and the fuel injection pump.

Figure 4 is a fragmentary enlarged elevation, partly in section, showing a modified arrangement of the injection pump and its governor.

Figure 5 is a front end elevation, partly in section, of the structure shown in Figure 4.

Figure 6 is a view similar to Figure 4 of a further modification utilizing an injection pump having its banks of pump cylinders arranged in V formation as contrasted to the in-line arrangement of the other embodiments, and Figure 7 is a view similar to Figure 5 of the structure shown in Figure 6.

Turning now to the accompanying drawings and considering first the preferred embodiment of the invention as shown in Figures 1 to 3, inclusive, the numeral 10 designates the block or housing of a multi-cylinder V-type internal combustion engine having rows or banks of cylinders 11 which diverge upwardly in usual manner. The cylinder heads of these respective cylinders are designated by the numeral 12. The engine is provided with a conventional crankshaft 13 rotatably supported in the crank case 15 of the engine block and in accordance with usual practice a preferably removable oil pan 14 secured beneath the downwardly opening crank case 15.

A scavenging air chamber or plenum chamber 16 is formed in the engine block above and between the two banks of cylinders 11 being preferably formed or cast as an integral part of the engine block. By reference to Figures 1 and 2 it will be noted that the chamber 16 terminates rearwardly somewhat short of the rearward end of the engine block or housing thereby providing room at said end of the housing for an opening 20 referred to in more detail hereinafter.

It will be understood that the air chamber 16 communicates with the intake ports of the respective cylinders in usual manner and is supplied with compressed air for delivery to the cylinders by means of a usual blower or compressor 17 which is shown as being mounted on and communicating with the air chamber 16 at the front end thereof. The blower 17 may be driven by conventional means such as a belt drive 18 from the crankshaft 13 of the engine.

A hollow gear box 19 is provided with a flat base 21 which is suitably bolted or otherwise secured over the opening 20 in the engine housing. It will be seen from Figure 1 that this hollow gear box communicates downwardly through its said base 21 and through the opening 20 with the interior of the engine housing.

A fuel injection pump 23 in the present instance is of the type wherein its several cylinders are arranged in relative alignment. The pump 23 in this case is of more or less conventional construction and operation and it will be understood that conventional pump pistons disposed in the respective cylinders are reciprocated in timed relation by a cam shaft or rotor 24 which extends into the gear box through an opening in its vertically disposed flat face 19a. It will be noted that the shaft 24 extends parallel to the engine crankshaft 13 and is driven from such crankshaft in timed relation thereto through a suitable train of gearing as shown in Figure 3, comprising a gear 25 fixed on the crankshaft and meshing with an idler gear 26 rotatably supported in the engine housing. The gear 26 in turn meshes with a gear 27 keyed on or otherwise fixed to the rotor shaft 24 of the injection pump. It will be seen that the gear box and engine housing jointly enclose the train of gearing thus defined and that such gear train extends through the opening 20 in the engine housing into the gear box 19.

As thus arranged it will be noted that the injection pump 23 has its casing provided with a preferably flanged base 22 which is bolted or otherwise preferably removably secured against the flat face 19a of the gear box at a location above the rear portion of the air chamber 16. The pump 23 thus is supported at one end only in cantilever fashion on the gear box 19 and projects forwardly therefrom over and above the air chamber 16. Even in a relatively short engine such as the six-cylinder type engine illustrated it will be apparent from Figure 1 that the injection pump 23 and blower 17 might both be accommodated between the banks of cylinders and within an overall length somewhat less than and in any event not exceeding that of the engine itself. Moreover, the mounting of the gear box 19 over the opening 20 in the engine housing and the termination of the air chamber adjacent one side of such opening permits the establishing of a completely enclosed and direct gear drive between the engine crankshaft and the injection pump.

As will be readily understood the several cylinders of the injection pump correspond in number to the number of cylinders in the engine and are respectively connected to the engine cylinders by usual conduits 28 arranged to deliver the charges of fuel from the pump cylinders into the engine cylinders in properly timed relationship under the control of the pump shaft 24. In other words, it will be understood that the injection pump operates to successively inject metered fuel charges of uniform volume into the cylinders in the firing order of the cylinders.

For regulating the size or the volume of the individual fuel charges to accommodate varying loads and speeds of the engine there is provided conventional charge-varying or regulating mechanism (as exemplified, for instance, in U.S. Patent 2,096,203 to Schnürle et al., granted October 19, 1937, or as disclosed in U.S. Patent 2,539,738 to Grim et al., granted January 30, 1951). For the purpose of the present invention it will suffice to point out that the said charge-regulating mechanism includes and is controlled by rectilinear lengthwise movement of a control rod 29. This rod extends and is movable parallel to the axis of the pump shaft 24 and is radially spaced therefrom so that its free end which is slidably received in the gear box 19 will avoid interference with the pump drive gear 27.

Fuel from any suitable source exemplified by the supply line 30 is constantly delivered to the injection pump 23 by means of a usual supply pump 31 mounted on and driven in usual manner from the injection pump. From the supply pump 31 a conduit 32 delivers the fuel to a usual strainer 33 from which it is then delivered by conduit 34 into the injection pump 23 for disposition to its respective cylinders, as will be readily understood by those skilled in the art.

For varying or regulating the volumes of the fuel charges supplied to the cylinders by the injection pump there is provided a speed responsive governor 35, the casing of which is affixed to the flat face 19a of the gear box. It will be seen therefore that the governor 35 in the preferred embodiment also is supported from the gear box in cantilever fashion overlying the air chamber 16 and in the present instance the governor is arranged side by side with the injection pump in the space between the two banks of cylinders. The rotary drive shaft 36 of the governor projects into the gear box 19 through an opening in its side 19a and has fixed thereon a gear 37 which meshes with the gear 27 on the pump shaft to thus drive the governor at a speed which is proportional to that of the engine.

It will be noted that the governor actuates a control rod which extends and is movable parallel to the governor drive shaft 36 the said movement of the control rod being responsive to changes in the rotational speed of the governor and thus of the engine. The free end of the governor control rod extends into and is freely movable in the gear box as may best be seen by reference to Figure 2. Although only the exterior of the governor itself is shown such a governor may be of any usual type as exemplified, for instance, in the patents above mentioned. As in the case of the pump control rod 29 the governor control rod is spaced radially from the governor shaft 36 sufficiently to avoid interference between the governor control rod and the driving gear 37 for the governor.

Controlling movement may be transmitted from the control rod 38 of the governor to the charge volume control rod 29 of the injection pump through any suitable gearing or linkage as exemplified by the lever 40 medially fulcrumed at 41 in the gear box and pivotally connected on opposite sides of its fulcrum as at 42 and 43 to the respective control rods. In order to permit relative radial displacement of the pivotal connections 42 and 43 relative to the lever 44 as an incident to the swinging movement of the latter about its fulcrum 41 the lever may be provided with radial or lengthwise slots 44 for reception of said pivots as indicated generally in Figure 2.

For the purpose of setting the governor to maintain the engine at any of various desired speeds by appropriate actuation of the injection pump control rod, the governor may be provided with a usual manual control lever 45 operating in any conventional manner though obviously it is not essential under all conditions that such a control lever 45 be provided.

In the operation of the preferred embodiment it will be apparent from the foregoing that the gear box 19, the injection pump 23, governor 35, feed pump 31, and fuel strainer 33, as well as the conduits 32 and 34, may all be preassembled as an operative unit adapted for mounting on the engine simply by attaching the gear box over the opening 20. The arrangement is such that by virtue of moving the gear box downwardly in applying it the gear 27 will be brought into operative intermeshing relation with the idler gear 26 which transmits rotary movement from the engine crankshaft 13. Moreover, with the unitary arrangement of parts in this manner the entire unitary structure, including gear box and units carried thereby may be readily removed from the engine at any time for testing, adjusting or repairing of any of the various units or elements in this structure. Obviously testing of the preassembled unit may be accomplished by mounting it on a test block with the gear 27 in driven engagement with any rotary drive means the fuel supply line 30 being temporarily connected to any fuel source whereupon rotation of the drive means will render the entire unit operative to facilitate its proper adjustment or repair.

In the modified form of the invention as illustrated in Figures 4 and 5 the structure and arrangement is substantially the same as that heretofore described and the various parts are accordingly designated by similar but primed reference characters. The structure of this modified embodiment differs from that of the preferred embodiment heretofore described primarily in that the governor 35', instead of being separately mounted on the gear box in side by side relation with the injection pump 23', is mounted directly on the forward end of and in line with the injection pump whereby both the pump and governor may be driven through common or aligned shafts from a single gear 27' within the gear box 19'. This utilizes a somewhat greater overall length of the combined parts and thus carries them up closer to the blower or compressor unit 17' but otherwise incorporates the unitary structure of the gear box, pump and governor as heretofore mentioned.

In the still further modification illustrated in Figures 6 and 7 the structure is similar to that shown in Figure 5 except that in place of the in-line type of injector pump as utilized in the preceding embodiments there is employed a V-type pump 23". The various elements of this embodiment are designated by similar but double-primed reference characters to those used in the preceding descriptions.

It will be seen that the two banks 46 and 47 of the pump cylinders in this injection pump 23" diverge upwardly relative to each other and preferably are parallel to the respective cylinders of the engine whereby the fuel lines or conduits 28" between the pump cylinders and their respective engine cylinders may be arranged in a very direct and simplified manner. Moreover it will be apparent that the usual (though not illustrated) pistons within the respective banks of cylinders may be operated by a common rotor or cam shaft 24" the axis of which extends along a line defined by the points of intersection of the respective cylinder axes designated by the reference characters 48 in Figure 7. Obviously the shortening of the length of the injection pump 23" achieved by virtue of its V-type cylinder arrangement contributes materially toward achieving compactness in the overall engine structure as will be particularly apparent through inspection of Figure 6 of the accompanying drawings.

In this application I have shown and described only the preferred form of my invention and certain variations thereof. However, I recognize that the invention may be further modified in various manners and that its several details may be changed in a number of ways all without departing from my invention. Accordingly, the foregoing drawings and description are to be considered as merely illustrative in nature and by no means as exclusive.

Having thus described my invention, I claim:

1. A hollow gear box having a horizontal base formed with a downward opening therethrough, and a vertical flat side at right angles to said base, a fuel injection pump of the type which injects successive metered charges of fuel and a speed responsive governor, both mounted on said flat side and having relatively spaced rotary drive shafts parallel to said base and to each other, said shafts extending into said box, gears fixed on the respective shafts within said box in intermeshing relation and in the vertical plane of said opening, whereby one of said gears may be in meshing engagement through said opening with a drive gear of the engine, said governor comprising a control rod projecting into said gear box for movement parallel to its said drive shaft responsive to changes in the rotational speed of its said drive shaft, and said pump comprising a control rod projecting into said gear box and movable parallel to its respective drive shaft to vary the volumes of said fuel charges, a lever medially fulcrumed in said box and pivotally connected on opposite sides of its fulcrum to the respective rods to transmit motion from said governor control rod to said pump control rod.

2. A hollow gear box having a horizontal base formed with a downward opening therethrough, and a vertical side wall, a fuel injection pump for delivering multiple successive charges of fuel of relatively uniform volume, and a speed responsive governor, both said pump and said governor being mounted exteriorly of the gear box on said vertical side wall, and having relatively spaced rotary drive shafts extending through said wall into said box, gearing within the box interconnecting said shafts for rotation together, said governor comprising a control rod projecting into said gear box for movement parallel to its said drive shaft, responsive to changes in rotational speed of the latter, said pump comprising a control rod projecting into said gear box for movement parallel to the pump drive shaft, to vary the volumes of said fuel charges, and linkage means within the gear box interconnecting said rods to transmit motion therebetween.

3. A multi-cylinder V-type internal combustion engine, including an engine block having spaced rows of cylinders, a rotary crankshaft, and a blower plenum chamber extending between said rows of cylinders for less than the full length of said crankshaft and said engine block, said engine block having an upward opening adjacent one end of the said plenum chamber, a hollow gear box removably secured over said opening and projecting above said plenum chamber, an injection pump carried by said gear box in cantilever fashion overlying said plenum chamber, said pump comprising a drive shaft rotatably disposed through a wall of said gear box, and a chain of gearing in said gear box and said engine block extending through said opening and operatively interconnecting said drive shaft in driven relation with said crankshaft.

4. The combination of claim 3 wherein said fuel pump includes control means for regulating the volume of the fuel charges injected by said pump, and a speed responsive rotary governor supported from said gear box in cantilever fashion overlying said plenum chamber, a linkage interconnecting said governor to said control means to vary the volume of said charges in accordance with the rotational speed of the governor, and means interconnecting said governor to said pump in driven relation therewith.

5. The combination of claim 3 wherein said fuel pump includes a fuel volume control rod relatively spaced from and disposed for control movement substantially parallel to the axis of said drive shaft, and a speed responsive rotary governor fixed on said gear box in cantilever fashion overlying said plenum chamber, said governor including a rotary drive shaft parallel to and spaced from said pump drive shaft, and projecting into said gear box, means within said gear box interconnecting said shafts for simultaneous rotation, a control rod carried by said governor for controlling movement generally parallel to said governor drive shaft and spaced therefrom, said governor control rod extending into said gear box, and means in said gear box interconnecting said rods and transmitting movement from one to the other.

6. The combination of claim 5, wherein said last mentioned means comprises a reversing lever medially fulcrumed in said gear box at a location between said rods, and pivotally connected to said rods on opposite sides of its said fulcrum.

7. The combination of claim 3 including a scavenger blower mounted on and communicating with said plenum chamber, said blower being spaced from the end of said chamber adjacent said gear box to accommodate said injection pump.

8. The combination as defined in claim 3, wherein the fuel injection pump comprises two rows of pump cylinders arranged in V configuration, with the axes of cylinders of the respective rows intersecting each other along a common axis, the axes of said rows of pump cylinders respectively being parallel to the axes of said rows of engine cylinders, and a control rotor for the respective cylinders rotatable in said pump about said axis.

References Cited in the file of this patent

UNITED STATES PATENTS

| | | |
|---|---|---|
| 2,300,313 | Pool | Oct. 27, 1942 |
| 2,303,093 | Schreck | Nov. 24, 1942 |
| 2,455,289 | Bailerlein | Nov. 30, 1948 |
| 2,482,332 | Eckert | Sept. 20, 1949 |
| 2,641,196 | Falcon | June 9, 1953 |
| 2,683,445 | Seaver | July 13, 1954 |